United States Patent [19]

Yoshimura

[11] Patent Number: 4,799,188

[45] Date of Patent: Jan. 17, 1989

[54] ELECTRONIC DICTIONARY SYSTEM HAVING IMPROVED MEMORY EFFICIENCY FOR STORAGE OF COMMON SUFFIX WORDS

[75] Inventor: Motokazu Yoshimura, Nagoya, Japan

[73] Assignee: Brother Kogyo Kabushiki Kaisha, Nagoya, Japan

[21] Appl. No.: 840,662

[22] Filed: Mar. 18, 1986

[30] Foreign Application Priority Data

Mar. 23, 1985 [JP] Japan .................. 60-58776

[51] Int. Cl.$^4$ .................. G06F 15/00; G06F 13/00
[52] U.S. Cl. .................. 364/900; 364/419
[58] Field of Search .............. 364/419, 200 MS File, 364/900 MS File; 434/156, 167, 169; 400/63, 83, 95, 100

[56] References Cited

U.S. PATENT DOCUMENTS

| | | | |
|---|---|---|---|
| 3,780,846 | 12/1973 | Kolpek et al. | 400/63 |
| 3,995,254 | 11/1976 | Rosenbaum | 382/57 |
| 4,041,467 | 8/1977 | Cota et al. | 364/900 |
| 4,136,395 | 1/1979 | Kolpek et al. | 364/518 |
| 4,158,236 | 6/1979 | Levy | 364/900 |
| 4,198,906 | 4/1980 | Fujikawa et al. | 364/900 |
| 4,218,760 | 8/1980 | Levy | 364/900 |
| 4,270,182 | 5/1981 | Asija | 364/900 |
| 4,323,315 | 4/1982 | Demonte | 400/63 |
| 4,328,561 | 5/1982 | Convis et al. | 364/900 |
| 4,339,806 | 7/1982 | Yoshida | 364/900 |
| 4,355,371 | 10/1982 | Convis et al. | 364/900 |
| 4,383,307 | 5/1983 | Gibson III | 364/900 |
| 4,384,329 | 5/1983 | Rosenbaum et al. | 364/300 |
| 4,408,302 | 10/1983 | Fessel et al. | 364/900 |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/900 |
| 4,456,969 | 6/1984 | Herzik et al. | 364/900 |
| 4,467,446 | 8/1984 | Sakurai | 364/900 |
| 4,481,607 | 11/1984 | Kobayashi et al. | 364/900 |
| 4,498,148 | 2/1985 | Glickman | 364/900 |
| 4,499,553 | 2/1985 | Dickinson et al. | 364/900 |
| 4,499,554 | 2/1985 | Kobayashi | 364/900 |
| 4,502,128 | 2/1985 | Okajima et al. | 364/900 |
| 4,503,426 | 3/1985 | Mikulski | 364/900 X |
| 4,503,514 | 3/1985 | Urquhart | 364/900 |
| 4,542,477 | 9/1985 | Noyori et al. | 364/900 |
| 4,546,973 | 6/1985 | Carlgren et al. | 364/900 |
| 4,548,520 | 10/1985 | Ueno | 400/63 |
| 4,559,598 | 12/1985 | Goldwasser et al. | 364/419 |
| 4,564,301 | 1/1986 | Ueno | 400/63 |
| 4,567,573 | 1/1986 | Hashimoto et al. | 364/900 |
| 4,580,241 | 4/1986 | Kucera | 364/900 |
| 4,584,667 | 4/1986 | Hashimoto et al. | 364/900 |
| 4,590,560 | 5/1986 | Sado | 364/419 |
| 4,594,686 | 6/1986 | Yoshida | 364/900 |
| 4,597,057 | 6/1986 | Snow | 364/900 |
| 4,611,995 | 9/1986 | Sado | 434/157 |
| 4,674,066 | 6/1987 | Kucera | 364/419 |
| 4,688,192 | 5/1987 | Lavin | 433/205 |
| 4,724,523 | 2/1988 | Kucera | 364/419 |

FOREIGN PATENT DOCUMENTS 5741738 of 0000 Japan .
5926280 of 0000 Japan .

OTHER PUBLICATIONS

"Eight Bit Character Encoding for Multiple Languages", V. A. Mayfield; *IBM Technical Disclosure Bulletin;* vol. 26, No. 2, p. 537, Jul. 1983, 400/63.

(List continued on next page.)

Primary Examiner—Gary V. Harkcom
Assistant Examiner—Lawrence E. Anderson
Attorney, Agent, or Firm—Parkhurst, Oliff & Berridge

[57] ABSTRACT

A system for checking a spelling of an English word which stores a plurality of English words in several groups. Every word in each group can have a common suffix and is stored without the suffix. The system searches whether or not an input word exists in the dictionary memory and judges next whether or not an input word has one of the suffixes by which the words in the dictionary memory are classified. If the input word has one of the suffixes, the system searches a de-suffixed form of the input word within the group corresponding to the suffix. The search result and input words are displayed on a cathode ray tube.

1 Claim, 7 Drawing Sheets

OTHER PUBLICATIONS

"Spelling Processing . . . Interface", Adam et al., *IBM Technical Disclosure Bulletin*, vol. 24, No. 10, pp. 5003–5008, Mar. 1982, 400/63.

"Method for Detecting and Correcting . . .", Barkir et al., *IBM Technical Disclosure Bulletin*, vol. 25, No. 8, p. 4225, Jan., 1983, 400/63.

"Spelling Checking Typewriter", Hackett, *IBM Technical Disclosure Bulletin*, vol. 18, No. 2, pp. 530–531, Jul. 1975, 400/74.

"Video Disc Dictionary System", Cohen et al., *IBM Technical Disclosure Bulletin*, vol. 25, No. 8, p. 4209, Jan., 1983, 400/63.

ELECTRONIC DICTIONARY SYSTEM HAVING IMPROVED MEMORY EFFICIENCY FOR STORAGE OF COMMON SUFFIX WORDS

BACKGROUND OF THE INVENTION

Technological Field

The invention disclosed herein relates to an electronic dictionary and more particularly relates to the structure which efficiently stores many words in a dictionary memory.

Prior Art

Conventional electronic dictionaries have been provided with a dictionary memory with many English words for spell-checking and usually a byte of capacity is used to represent one character. When a English word is keyed on a keyboard, a central processing unit (CPU) judges whether or not an input word is already stored in the dictionary memory and informs the operator when the word does not exist by flashing the input word on the cathode ray tube (CRT).

The conventional electronic dictionaries have stored the spelling of an English word which includes an inflection as it is. This has been a primary factor of increasing costs, since a large capacity dictionary memory is required, where a number of bytes equal to the total of number of letters in each word are needed.

SUMMARY OF THE INVENTION

It is an object of this invention to provide an electronic dictionary which stores more data of English words in its specific section of a memory by reducing its memory space to aid in the solution of the aforementioned problem.

In accordance with the system in the foregoing, an apparatus for checking a spelling of an English word is provided which comprises:

an input means for inputting an English word;

an electronic dictionary memory for storing a plurality of English words including groups of classified words, wherein every word in each group can have a common suffix and is stored without the suffix;

a search means for searching whether or not an input word exists in the dictionary memory;

a suffix judgment means for judging whether or not an input word has one of the suffixes by which the words of the dictionary memory are classified and, if the input word has one of the suffixes, for searching a de-suffixed form of the input word within the group corresponding to the suffix making use of the search means; and an output means for displaying input words and for displaying the search result.

DETAILED DESCRIPTION OF THE PREFERRED EMBODIMENT

Some embodiments according to the present invention will be described with reference to the drawings of a word processor with an electronic dictionary.

Figure 1:
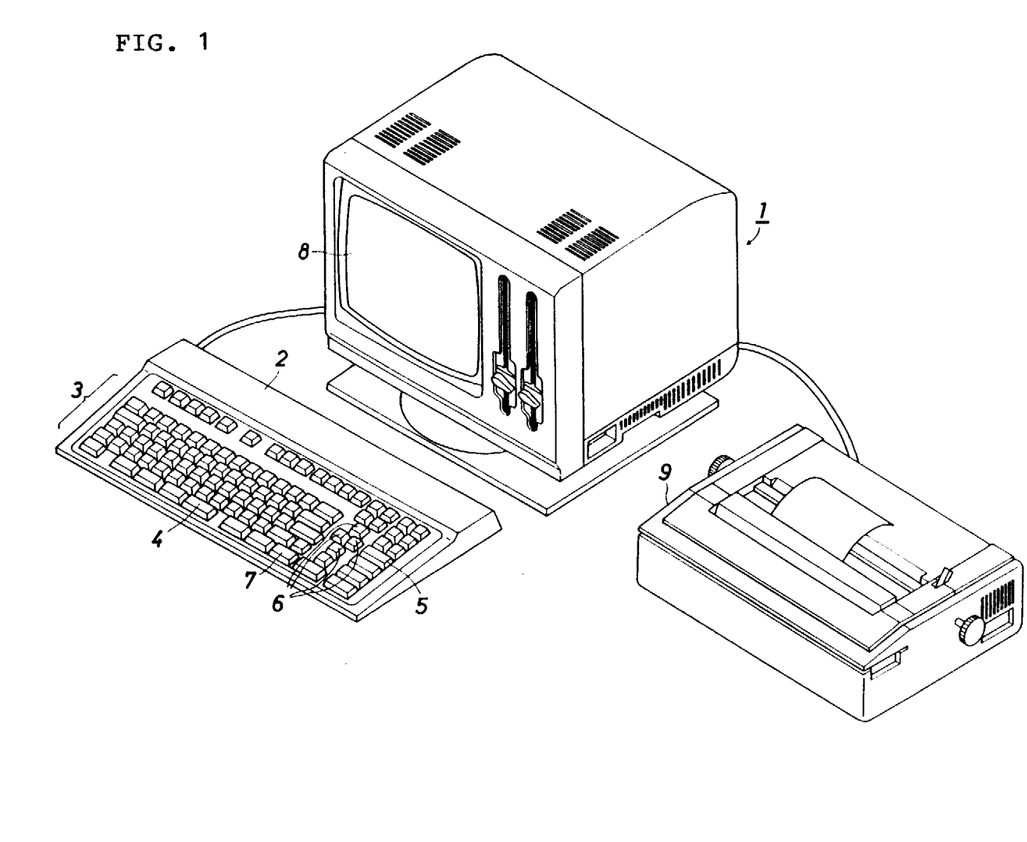
FIG. 1 is a perspective view of a word processor embodying the present invention.

The word processor is provided with many character keys 3 and a space key 4 on a keyboard 2 as input means. And the corresponding character data such as letters and figures are selectively keyed by character keys 3.

A correction key 5 and a cursor key 6 are provided at the right of the character keys 3, and used to correct miskeyed English words. A select key 7 is provided under the correct key 5 to exchange a wrongly keyed word with a correct word by the correct key 5 and the character keys 3.

At the back of the keyboard 2, a CRT 8 is provided as a display means for displaying characters and figures keyed by the character keys 3. A printer 9 is provided by the side of the CRT 8 and English sentences can be printed on printing sheets.

Figure 2:
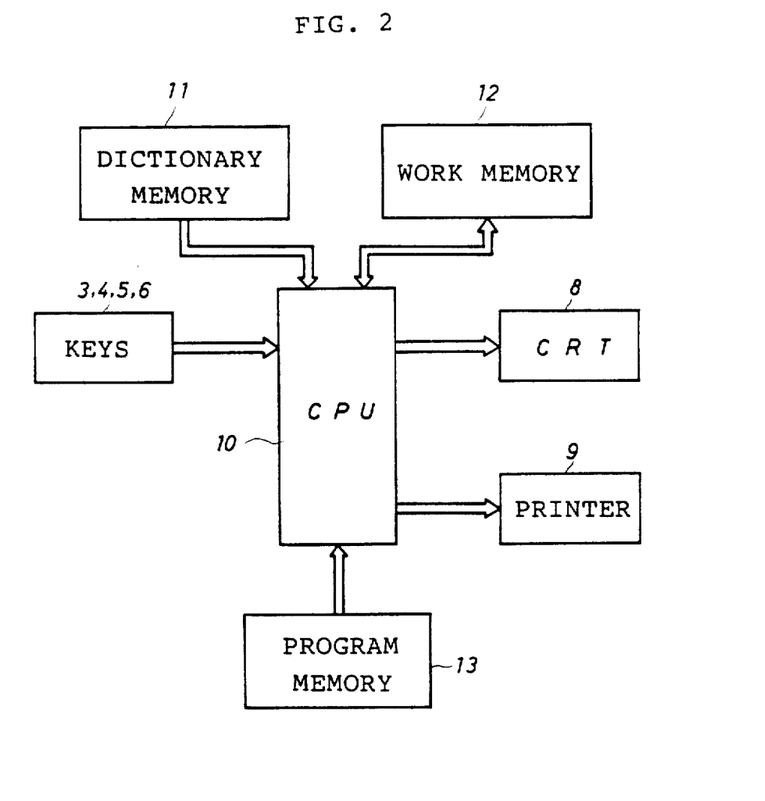
FIG. 2 is a block diagram showing the electronic construction of an embodiment according to the present invention.

Referring now to FIG. 2, the electronic construction of the aforementioned word processor 1 is illustrated.

Characters are displayed on the CRT 8 by the central processing unit (CPU) 10 which orders a display means and a judging means, and receives output word data signals by the operation of each key and displays words from those signals.

A program memory 13 which is connected to the CPU 10 is made of a read only memory (ROM) and stores program data to execute word processing.

A dictionary memory 11 which is connected to the CPU 10 is made of a ROM and stores English word data in such a way that words with a common form of inflection are stored in a specific region of the memory with a selecting information for the suffixes.

Figure 3:
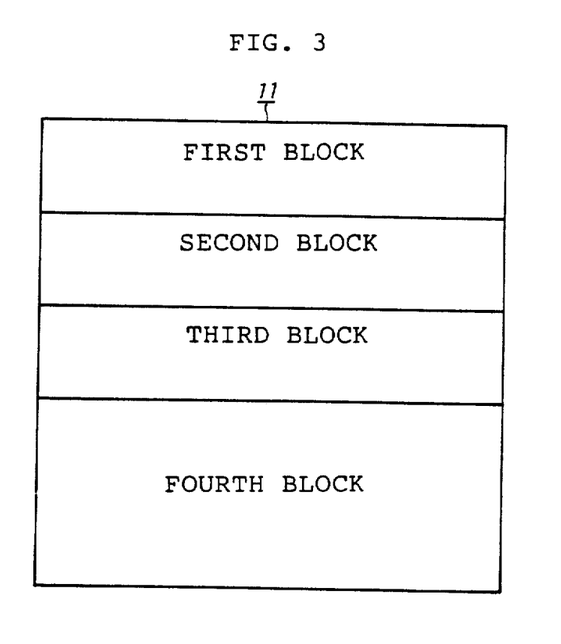
FIG. 3 is a diagram illustrative of the inside of a dictionary memory.

Referring now to that construction with reference to FIG. 3, in the dictionary memory 11, a first block stores nouns or verbs which take inflections with a suffix "s", in their de-suffixed forms, a second block stores verbs which take all inflections with suffixes "s", "ing", and "ed" in their de-suffixed forms, a third block stores de-suffixed adjectives which include the suffix "ly", and all fourth block stores the other words.

A work memory 12 is made of a random access memory (RAM) which is also connected to the CPU 10 and stores character data input by character keys 3 and the space key 4 via CPU 10. The CPU 10 announces to the operator the result of spell-checking by blinking on the CRT 8 after judging if the input English word keyed by the character keys 3 and the space key 4 exists in the dictionary memory or not and finding that it does not.

Figure 4A:
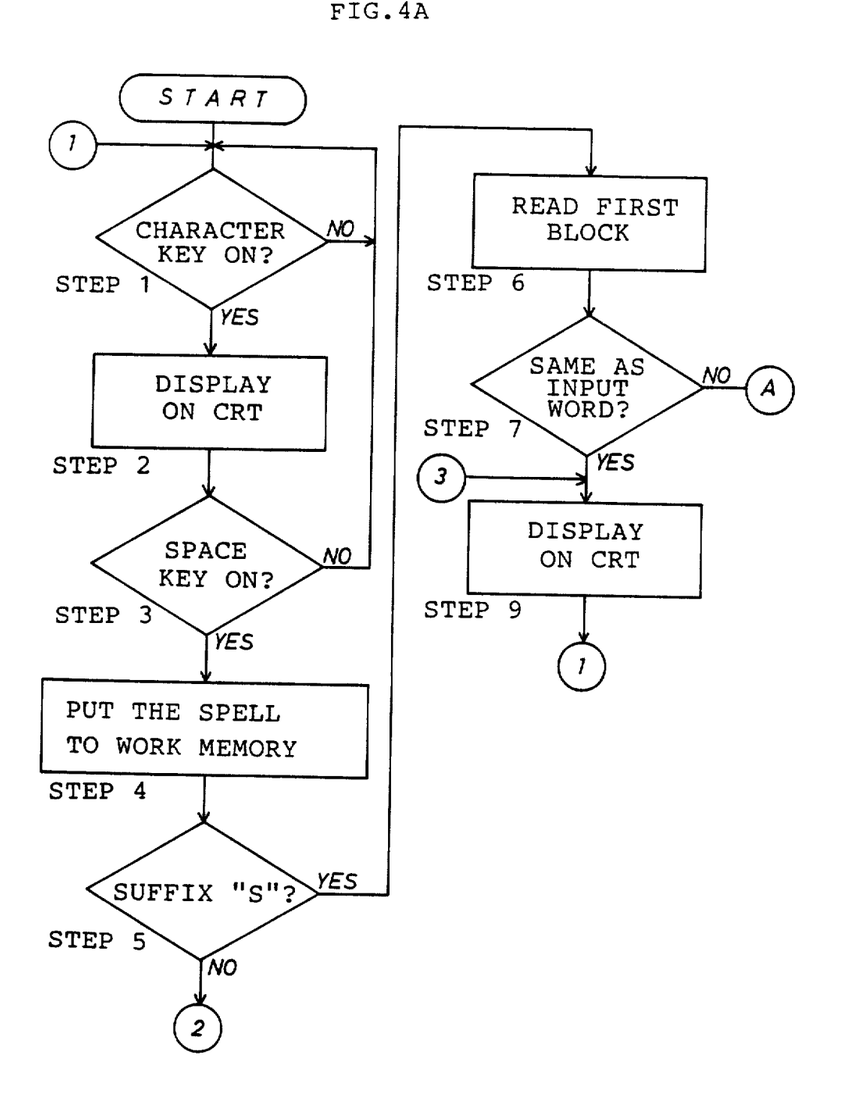
FIGS. 4A, 4B, 5, 6 are flow charts showing processing steps which are performed by this word processor.
Figure 4B:
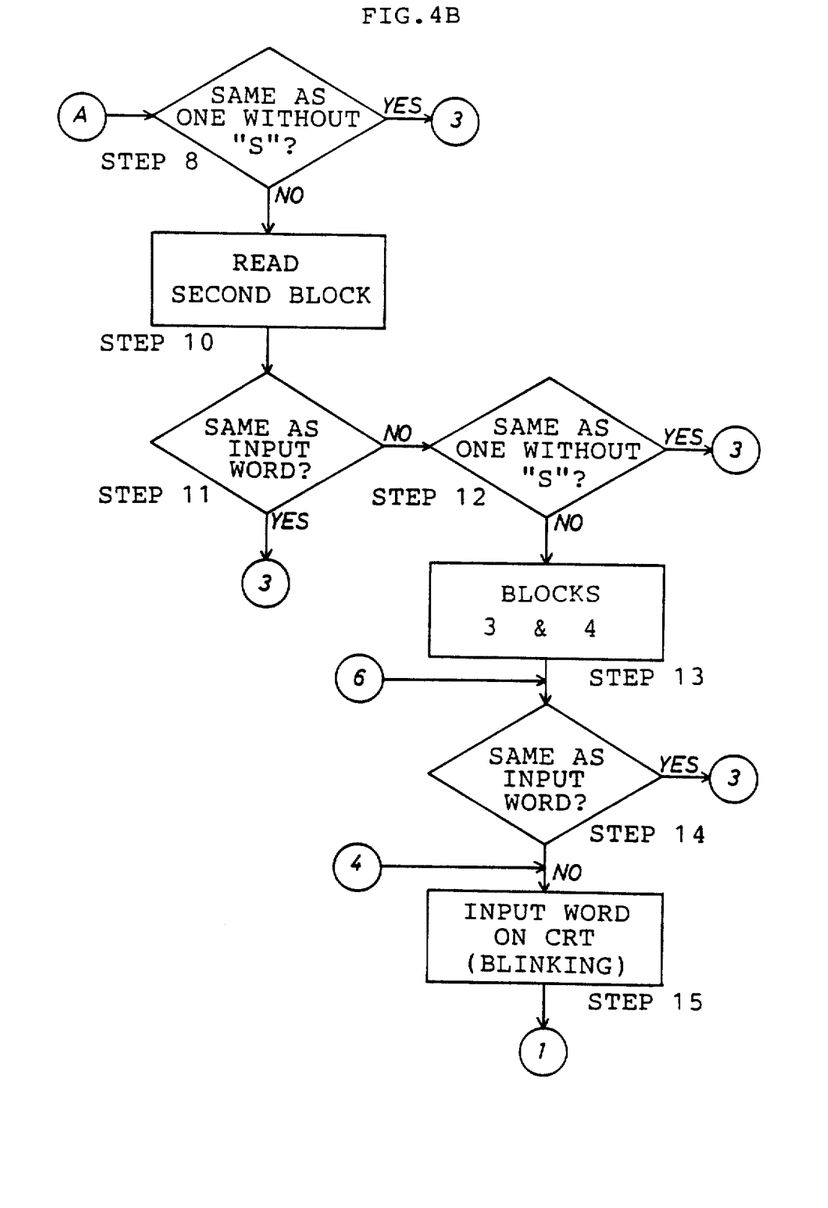

The operation of the word processor 1 constructed in aforementioned manner will be described with reference to FIGS. 4–6. The method comprises the steps of:

(1) keying English characters or numerics by the character keys 3 (step 1);

(2) displaying said characters on the CRT 8 one by one (step 2);

(3) keying of the space key 4 for leaving space for the following words, after keying the desired word by the character keys 3 (step 3);

(4) storing the spelling of the input characters in the work memory 12 as one word (Step 4); and (5) searching if the input word exists in the dictionary memory 11 or not by comparing the word with every word stored in the dictionary memory 11. The CPU 10 displays the input word as it is on the CRT 8 when the word is not misspelled and exists in the dictionary memory 11 and waits for the next keying.

Referring now to the detailed description of the operation, the CPU 10 stores word data in the work memory 12 when an English word, for example "girls", is keyed by the character keys 3 and the space key 4 (step 4), and judges if the suffix is "s" or not (step 5). When it judges that the suffix is "s", the CPU 10 reads out word data stored in the first block of the dictionary memory 11 shown in FIG. 3 (step 6), and judges if the corresponding word exists in the first block or not (step 7). Since "girls" is a plural noun and in the first block is stored the word "girl" in the singular, the CPU 10 judges that "girls" does not exist in the first block and judges next if the de-suffixed word "girl" exists in the first block or not (step 8). When "girl" is found to exist in the first block (step 9), the CPU 10 displays the word "girls" as it is on CRT 8 and waits for the next operation (step 1).

For example, a verb like "play" which can take any one of suffixes "s", "ing", and "ed" is stored in the second block of the dictionary memory 11 as mentioned above. And as for "play", when "plays" is keyed after judging that a corresponding word does not exists in the first block (steps 6, 7 and 8), the CPU 10 reads out word data stored in the second block in sequence (step 10) to judge if a corresponding word to input word "plays" exists or not (step 11). Since a spelling of "play" is stored in the second block, the CPU 10 judges that the input word "plays" does not exists in the second block and searches the de-suffixed word "play" in the second block (step 12). When it judges that the word "play" exists in the second block, the CPU 10 displays the input word "plays" as it is on CRT 8 (step 9), and waits for the next operation (step 1).

On the other hand, when a word data corresponding to a word or to a de-suffixed (without "s") word does not exist in the first block or second block, even though the word has the suffix (steps 6, 7, 8, 9, 10, 11 and 12), the CPU 10 reads out word data in the third block and fourth block in sequence (step 13), and judges if the corresponding word exists or not (step 14). The CPU 10 displays the word as it is on the CRT 8 when it does exist (step 9), and waits for the next operation (step 1), or displays the input word by blinking on the CRT 8 when it does not exist (step 15) to show the operator that the word does not exist in the dictionary memory 11 and waits for the next operation (step 1).

Figure 5:
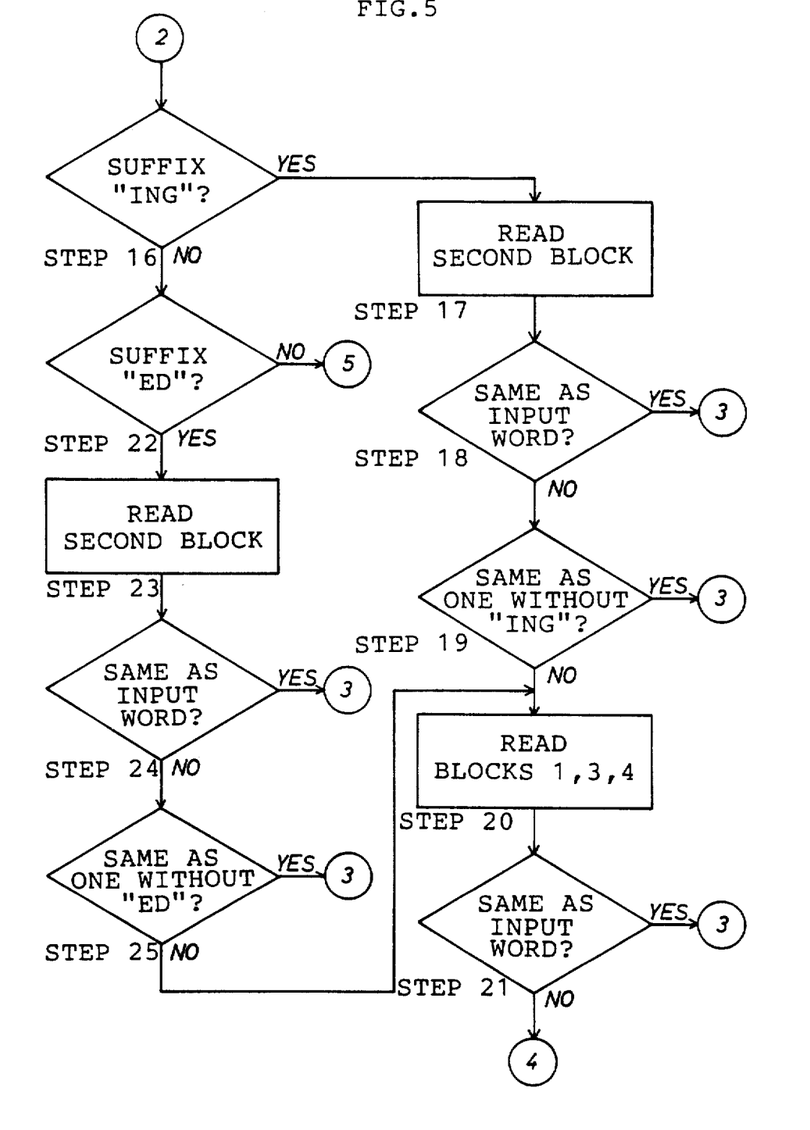
Figure 6:
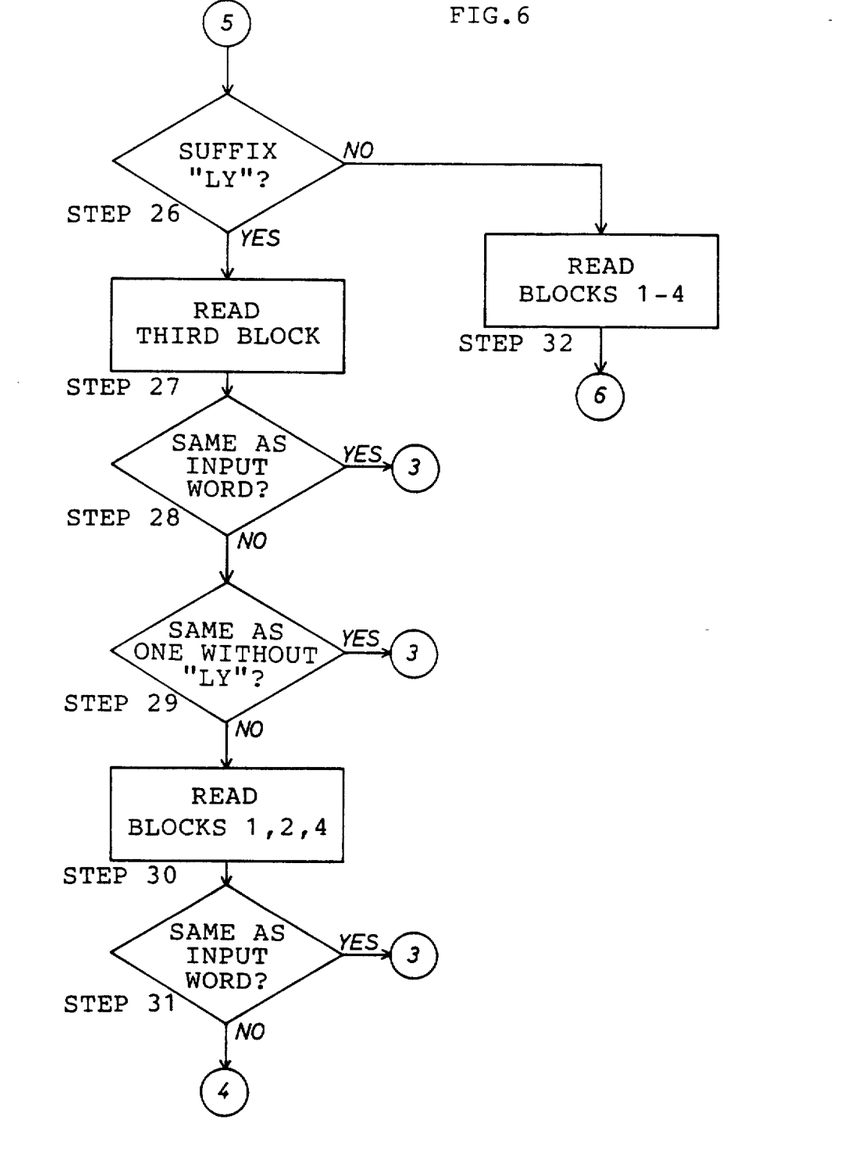

As for the aforementioned word "play", the CPU 10 displays the word on the CRT 8 and stores it in the work memory (steps 1-4) after receiving the word "playing" by character keys 3 and the space key 4, and judges if it has a suffix "ing" or not (step 16) as shown in FIG. 5, when it judges that it has no suffix "s" (step 5). The CPU 10 then reads out a word data in the second block of the dictionary memory 11 (step 17), when it finds that the word has a suffix "ing", and judges if a word corresponding to the input "playing" (step 18) or to de-suffixed "play" (step 19) exists or not. Thus, the CPU 10 judges that the word "play" appears in the second block and displays the input word "playing" on the CRT 8 (step 9), and waits for the next key operation (step 1).

If a word corresponding to a word or a word without "ing" does not exist in the second block, even though the word has a suffix "ing" (step 18, 19), word data in the first, third and the fourth blocks will be read out in sequence (step 20) and judged if a word data corresponding to a input word exists or not (step 21). The CPU 10 displays the word as it is on the CRT 8 (step 9) when it exists, and displays the word by blinking on the CRT 8 when it does not (step 15), and waits for the next operation (step 1).

As for the word "play", when "played" is keyed by character keys 3 and space key 4, the CPU 10 displays the word on the CRT and stores it in the work memory (steps 1-4), and if the word is found not to have suffixes "s" or "ing" (steps 5, 16), it will be judged next if it has suffix "ed" or not (step 22). When the word is found to have a suffix "ed", word data stored in the second block of the dictionary memory 11 are read out in sequence (step 23) and judged if a word data corresponding to the input word "played" or to the de-suffixed word "play" exists or not (steps 24, 25). When a corresponding word appears in the memory, the CPU displays the input word "played" on the CRT 8 as it is (step 9), and waits for the next operation (step 1).

If the word is found not to exist in the second block even though it has suffix "ed", (step 24, 25), the CPU 10 reads out next word data in the third and the fourth blocks and judges if a corresponding word data exists or not (step 21), and displays the word on the CRT 8 as it is if it does (step 9), and displays it on CRT 8 by blinking if it does not (step 15) and waits for the next operation (step 1).

For example, when such a word as "slowly" which is an adverb made by adding "ly" to an adjective "slow" is keyed on the character keys 3 and space key 4, the CRT 8 displays the word on the CRT 8 and stores it in the work memory (steps 1-4). When it judges that it has no suffixes "s", "ing", nor "ed", (steps 5, 16, 22) it judges next if it has "ly" as a suffix or not as shown in FIG. 6 (step 26). When "ly" is found to be added as a suffix, data of words are read one by one in the third block of the dictionary memory 11 (step 27) to find if a word data corresponding to the input word "slowly" or to its de-suffixed root "slow" exists or not (steps 28, 29). The CPU 10 displays the input word "slowly" as it is on the CRT 8 if it does (step 9), and waits for the next keying (step 1).

If an input word is found not to exist in the third block even though it has a suffix "ly" (steps 28, 29), the CPU 10 reads word data in the first, second and fourth blocks (step 30), and judges if a word data corresponding to the input word exists or not (step 31). The CPU displays the word as it is on the CRT 8 if it does (step 9), and displays the word by blinking if it does not (step 15), and waits for the next keying (step 1).

When a word which does not have any one of suffixes "s", "ing", "ed" and "ly" is keyed by the character keys 3 and space key 4, the CPU 10 displays the word on the CRT 8 and stores it in the work memory (steps 1 to 4). The CPU then judges that it has no suffixes "s", "ing", "ed", nor "ly" (steps 5, 16, 22, 26), and reads word data in the first to fourth blocks (step 32), and judges if a word data corresponding to the input word exists or not (step 14). The CPU displays it as it is on the CRT 8 (step 9) when it does, and displays the word by blinking on the CRT 8 when it does not (step 15) and waits for the next operation (step 1).

When words whose suffixes are "s", "ing", "ed" or "ly" are keyed in steps 7, 24, 28, word datum is searched for to see if an input word with suffixes appears or not. This is because words whose original forms contain those suffixes can exist. Thus, the reliability of searching is assured by reading from word data in other blocks and searching for the corresponding word (steps 13, 20, 30).

As for the word which is displayed by blinking on the CRT 8 to show that it does not appear in the dictionary memory 11, the word is selected by cursor key 6 and corrected by the correct key 5 and character keys 3 and stored in the work memory (as a right word instead of the wrong one) by pushing the select key 7 when the word is misspelled. When no misspelling is found in the blinking word, the word is selected by the cursor key 6 and stored in the work memory 12 as it is by pushing the select key 7.

What has been described herein is a word processor wherein (1) nouns and verbs of English words whose suffixes are "s" and which take inflections with suffix "s" are stored in the first block of the dictionary memory 11 in their de-suffixed forms, (2) those words which can take any inflections with suffixes "s", "ing" and "ed" are stored in the second block as their original forms, (3) words which have derivatives added by "ly" as their suffixes are stored in all third block, and (4) the other words are stored in the fourth block. When words with those suffixes are keyed, the CPU 10 reads and compares a word data in the corresponding block to the suffix, and when no corresponding word is found, it reads and compares next the word data in the other blocks, and when the input word does not appear in the dictionary memory, displays the word on the CRT 8 by blinking.

Consequently, since words with common suffixes "s", "ing", "ed" or "ly" are stored in their de-suffixed original forms in the specific regions in the dictionary memory 11, memory space can be largely reduced and economized than when they are stored with those suffixes and more word data can be stored in small-capacity dictionary memory 11. Since input words are compared with word data of the dictionary memory 11 by the CPU 10 and displayed by blinking when no corresponding word is found in the dictionary memory 11, confirmation and correction of the spelling of a word is easily done.

What has been described in detail as an effect of the embodiment is an electronic dictionary which is effective in storing many words in a limited memory by economizing in memory space.

What is claimed is:

1. A system for checking a spelling of an input English word comprising:
   an input means for inputting an English word;
   an electronic dictionary memory for storing English words in four groups, wherein every word in each group can have a common suffix and is stored without the suffix, and the four groups include a first group of words that can have a suffix "s"; a second group of words that can have a suffix "s", "ing", or "ed"; a third group of words that can have a suffix "ly"; and a fourth group of other words;
   a search means for searching whether or not an input word exists in the dictionary memory;
   a suffix judgement means for judging whether or not an input word has one of the suffixes by which words in the dictionary memory are classified and, if the input word has one of the suffixes, for eliminating the suffix of the input word and for cooperating with the search means to search for word data in the dictionary memory coincident with a de-suffixed form of the input word within the group corresponding to the suffix,
   wherein if the input word does not have one of the suffixes by which the words in the dictionary are classified, or if word data coincident with the de-suffixed form of the input word does not exist within the group corresponding to the suffix, the search means searches for word data in the dictionary memory coincident with the input word; and
   an output means for displaying the input word and, if word data coincident with the input word or de-suffixed form of the input word does not exist in the dictionary memory, for displaying the input word distinctively.

* * * * *